US012627087B2

(12) United States Patent
Fan et al.

(10) Patent No.: US 12,627,087 B2
(45) Date of Patent: May 12, 2026

(54) BOARD-LEVEL ARCHITECTURE AND COMMUNICATIONS DEVICE

(71) Applicant: HUAWEI TECHNOLOGIES CO., LTD., Shenzhen (CN)

(72) Inventors: Jianxin Fan, Beijing (CN); Guodong Zhang, Dongguan (CN); Jian Zhang, Dongguan (CN); Zhefeng Xiao, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 817 days.

(21) Appl. No.: 18/070,699

(22) Filed: Nov. 29, 2022

(65) Prior Publication Data

US 2023/0122445 A1 Apr. 20, 2023

Related U.S. Application Data

(63) Continuation of application No. PCT/CN2021/096500, filed on May 27, 2021.

(30) Foreign Application Priority Data

May 30, 2020 (CN) ......................... 202010480697.2

(51) Int. Cl.
*H01R 12/73* (2011.01)
*H01R 12/70* (2011.01)

(52) U.S. Cl.
CPC ....... *H01R 12/737* (2013.01); *H01R 12/7064* (2013.01); *H01R 2201/24* (2013.01)

(58) Field of Classification Search
CPC .............. H01R 12/737; H01R 12/7064; H01R 2201/24; H01R 12/722; H05K 1/144;
(Continued)

(56) References Cited

U.S. PATENT DOCUMENTS 10,062,984 B2 * 8/2018 Regnier ............... H01R 9/0515
2004/0094328 A1 * 5/2004 Fjelstad ............... H01R 12/714 174/251

(Continued)

FOREIGN PATENT DOCUMENTS

CN 101048034 A 10/2007
CN 101097603 A 1/2008

(Continued)

OTHER PUBLICATIONS

Office Action issued in JP2022-573531, dated Jul. 8, 2024 with English translation, 7 pages.

(Continued)

*Primary Examiner* — Travis S Chambers

(57) ABSTRACT

A board-level architecture and a communications device are disclosed. The board-level architecture includes a support board, a switch board, and a press fit component. The press fit component includes a cable, a first connector component press-fitted on a side edge of the support board, and a second press fit cable connector press-fitted on a side edge of the switch board. The first connector component includes a first press fit cable connector and a pluggable connector that is electrically connected to the first press fit cable connector, and the pluggable connector is farther from the support board than the first press fit cable connector. The first press fit cable connector is connected to the second press fit cable connector through the cable.

13 Claims, 9 Drawing Sheets

(58) Field of Classification Search
CPC .... H05K 3/366; H05K 7/1444; H05K 7/1451; H05K 2201/042; H05K 2201/10189; H05K 2201/1059
See application file for complete search history.

(56) References Cited

U.S. PATENT DOCUMENTS

| | | | | |
|---|---|---|---|---|
| 2005/0064736 | A1 | 3/2005 | Korsunsky et al. | |
| 2005/0205402 | A1 | 9/2005 | Wright et al. | |
| 2012/0071034 | A1 | 3/2012 | Li | |
| 2013/0107489 | A1 | 5/2013 | Wen et al. | |
| 2014/0068286 | A1* | 3/2014 | Nguyen | G06F 1/181 361/679.08 |
| 2015/0162680 | A1 | 6/2015 | Costello et al. | |
| 2016/0043484 | A1* | 2/2016 | Brodsky | H05K 3/366 439/65 |
| 2017/0079155 | A1 | 3/2017 | Zhang et al. | |
| 2018/0013220 | A1 | 1/2018 | Haensgen et al. | |
| 2020/0381872 | A1* | 12/2020 | Laurx | H01R 13/6587 |
| 2021/0076527 | A1 | 3/2021 | Yang et al. | |
| 2022/0386494 | A1* | 12/2022 | Bi | H01R 25/006 |
| 2023/0137275 | A1* | 5/2023 | Morgan | H01R 13/73 439/65 |

FOREIGN PATENT DOCUMENTS

| | | | |
|---|---|---|---|
| CN | 101237129 | A | 8/2008 |
| CN | 101877932 | A | 11/2010 |
| CN | 103051566 | A | 4/2013 |
| CN | 103503590 | A | 1/2014 |
| CN | 103515727 | A | 1/2014 |
| CN | 103718658 | A | 4/2014 |
| CN | 104064893 | A | 9/2014 |
| CN | 108879150 | A | 11/2018 |
| CN | 107112666 | B | 4/2019 |
| CN | 109757052 | A | 5/2019 |
| CN | 110337182 | A | 10/2019 |
| CN | 210328152 | U | 4/2020 |
| CN | 107548480 | B | 8/2020 |
| CN | 113745868 | A | 12/2021 |
| EP | 2581988 | A1 | 4/2013 |
| JP | S6489170 | A | 4/1989 |
| WO | 2011150737 | A1 | 12/2011 |
| WO | 2015049770 | A1 | 4/2015 |
| WO | 2015070393 | A1 | 5/2015 |
| WO | 2015145975 | A1 | 10/2015 |

OTHER PUBLICATIONS

International Search Report and Written Opinion issued in PCT/CN2021/096500, dated Aug. 26, 2021, 10 pages.
Office Action issued in CN202010480697.2, dated Mar. 24, 2022, 9 pages.
Extended European Search Report issued in EP21817196.5, dated Sep. 29, 2023, 7 pages.
Office Action issued in JP2022-573531, dated Feb. 13, 2024, with English translation 9 pages.

* cited by examiner

BOARD-LEVEL ARCHITECTURE AND COMMUNICATIONS DEVICE

CROSS-REFERENCE TO RELATED APPLICATIONS

This application is a continuation of International Application No. PCT/CN2021/096500, filed on May 27, 2021, which claims priority to Chinese Patent Application No. 202010480697.2, filed on May 30, 2020. The disclosures of the aforementioned applications are hereby incorporated by reference in their entireties.

TECHNICAL FIELD

This disclosure relates to the field of communications technologies, and in particular, to a board-level architecture and a communications device.

BACKGROUND

In a communications system, different boards implement connections and communication of signals through connectors. In a current common communications system, vertical orthogonality is a common orthogonal architecture form. To implement insertion, removal, and replacement of a board, a large quantity of connectors is used in the system. FIG. 1 is a schematic diagram of a simple communications system. When a board 1 communicates with a board 2, both a connector 1 and a connector 2 are directly press-fitted on different boards, and then fit each other to implement transmission of a signal channel.

In this system, as a quantity of boards 2 increases, a size of the board 1 becomes increasingly larger. Consequently, it is more difficult to process the board 1. In addition, as a signal transmission rate increases, electrical signal loss caused by a larger size of the board 1 also increases. To resolve the problem of the increase in the electrical signal loss, two solutions are mainly used currently. One method is to add a signal amplifier on the board 1, but implementation of the board 1 is complex and costs are high. The other method is to use a wire/cable with superior signal transmission quality, and this method also represents a trend for future development. However, when the wire/cable is used to transmit a signal, an inter-board connector is added. When different types of connectors are disposed on the board 2, implementing an inter-board connection becomes troublesome.

SUMMARY

This disclosure provides a board-level architecture and a communications device, to simplify a connection of the board-level architecture and increase flexibility of the board-level architecture during construction.

According to a first aspect, a board-level architecture is provided, where the board-level architecture includes a support board, a switch board, and a press fit component, and the press fit component is configured to implement an electrical connection between components. The press fit component includes a cable, a first connector component press-fitted on a side edge of the support board, and a second press fit cable connector press-fitted on a side edge of the switch board. The first connector component includes a first press fit cable connector and a pluggable connector that is electrically connected to the first press fit cable connector, and the pluggable connector is farther from the support board than the first press fit cable connector. The first press fit cable connector is connected to the second press fit cable connector through the cable. When in use, the pluggable connector is configured to electrically connect to a connector of another board, to implement a communication connection between the switch board and the another board. Therefore, it is only required that the pluggable connector and the connector of the another board match, the first press fit cable connector and the second press fit cable connector may be decoupled from the connector of the another board, and the first press fit cable connector and the second press fit cable connector each may be another type of connector, so that flexibility of the board-level architecture during construction is increased. In addition, the second press fit cable connector may be directly electrically connected to the switch board without a need of disposing a connector corresponding to the second press fit cable connector, so that a structure of the board-level architecture is simplified.

In a specific feasible solution, an adapter component is disposed on the support board, and the first press fit cable connector and the pluggable connector are respectively press-fitted on two opposite surfaces of the adapter component. A connection between the pluggable connector and the first press fit cable connector is facilitated.

In a specific feasible solution, a plurality of metalized vias is disposed on the adapter component; the first press fit cable connector has first pins that fit the plurality of metalized vias; and the pluggable connector has second pins that fit the plurality of metalized vias. The pluggable connector is electrically connected to the first press fit cable connector through the metalized vias.

In a specific feasible solution, the board-level architecture further includes a service board. The service board has a connector, and the connector of the service board may be detachably connected to the pluggable connector. The service board is configured to electrically connect to the switch board, and the connector of the service board is detachably connected to the pluggable connector. In addition, the connector of the service board and the first press fit cable connector may be decoupled through the pluggable connector.

In a specific feasible solution, there are a plurality of first press fit cable connectors, and there is one second press fit cable connector; and the plurality of first press fit cable connectors is connected to the second press fit cable connector through the cable; or there is one first press fit cable connector, and there are a plurality of second press fit cable connectors; and the first press fit cable connector is connected to the plurality of second press fit cable connectors through the cable. The first press fit cable connector and the second press fit cable connector may be disposed by using different correspondences.

In a specific feasible solution, the support board and the switch board are disposed in parallel.

According to a second aspect, a board-level architecture is provided, where the board-level architecture includes a backplane and a press fit component. The backplane includes a first surface and a second surface that are opposite to each other, and the press fit component includes a first connector component, a second connector component, and a cable. The first connector component includes a first pluggable connector press-fitted on the first surface and a first press fit cable connector press-fitted on the second surface, and the first press fit cable connector is electrically connected to the first pluggable connector. The second connector component includes a second pluggable connector press-fitted on the first surface and a second press fit cable connector press-fitted on the second surface, and the second press fit cable connector is electrically connected to the second pluggable connector. The first press fit cable connector is connected to the second press fit cable connector through the cable. In the foregoing solution, the first pluggable connector and the second pluggable connector are respectively connected to a switch board and a service board. Therefore, it is only required that the two pluggable connectors and a connector of another board match, the first press fit cable connector and the second press fit cable connector may be decoupled from the connector of the another board, and the first press fit cable connector and the second press fit cable connector each may be another type of connector, so that flexibility of the board-level architecture during construction is increased. In addition, other boards connected to the backplane may be located on a same side of the backplane to facilitate a detachable connection between the service board and a fabric card.

In a specific feasible solution, the backplane includes a high-speed backplane and a power supply backplane that are stacked upon each other; the first press fit cable connector and the second press fit cable connector are separately press-fitted on a second surface of the high-speed backplane; the first pluggable connector and the second pluggable connector are separately press-fitted on a first surface of the high-speed backplane; and through-holes for avoiding the first pluggable connector and the second pluggable connector are disposed on the power supply backplane. Two different boards carry different components.

In a specific feasible solution, the power supply backplane is configured to implement transmission of a low-speed signal and a power supply signal, and the high-speed backplane is configured to implement transmission of a high-speed signal.

In a specific feasible solution, an adapter component is disposed on the high-speed backplane; the first press fit cable connector and the first pluggable connector are respectively press-fitted on two opposite surfaces of the adapter component; and the second press fit cable connector and the second pluggable connector are separately press-fitted on the two opposite surfaces of the adapter component. A connection between the press fit cable connector and the pluggable connector is implemented through the adapter component.

In a specific feasible solution, a plurality of metalized vias is disposed on the backplane; the first press fit cable connector and the second press fit cable connector each have first pins that fit the plurality of metalized vias; and the first pluggable connector and the second pluggable connector each have second pins that fit the plurality of metalized vias.

In a specific feasible solution, the board-level architecture further includes a service board and a switch board. The service board and the switch board each have a connector, the connector of the service board may be detachably connected to the first pluggable connector, and the connector of the switch board may be detachably connected to the second pluggable connector. The board-level architecture is formed by the service board and the switch board.

In a specific feasible solution, there is a plurality of first press fit cable connectors, and there is one second press fit cable connector; and the plurality of first press fit cable connectors is connected to the second press fit cable connector through the cable; or there is one first press fit cable connector, and there is a plurality of second press fit cable connectors; and the first press fit cable connector is connected to the plurality of second press fit cable connectors through the cable. The first press fit cable connector and the second press fit cable connector may be disposed by using different correspondences.

According to a third aspect, a communications device is provided. The communications device includes a housing and the board-level architecture according to any one of the foregoing feasible solutions that is disposed in the housing. A pluggable connector is configured to electrically connect to a connector of another board. Therefore, it is only required that the pluggable connector and the connector of the another board match, a first press fit cable connector and a second press fit cable connector may be decoupled from the connector of the another board, and the first press fit cable connector and the second press fit cable connector each may be another type of connector, so that flexibility of the board-level architecture during construction is increased. In addition, the second press fit cable connector may be directly electrically connected to a switch board without a need of disposing a connector corresponding to the second press fit cable connector, so that a structure of the board-level architecture is simplified. When the board-level architecture is a backplane structure, in addition to implementing decoupling the press fit cable connector, boards connected to a backplane may be disposed on a same side of the backplane to facilitate insertion and removal.

DESCRIPTION OF EMBODIMENTS

The following further describes the embodiments of this disclosure in detail with reference to the accompanying drawings.

Figure 1:
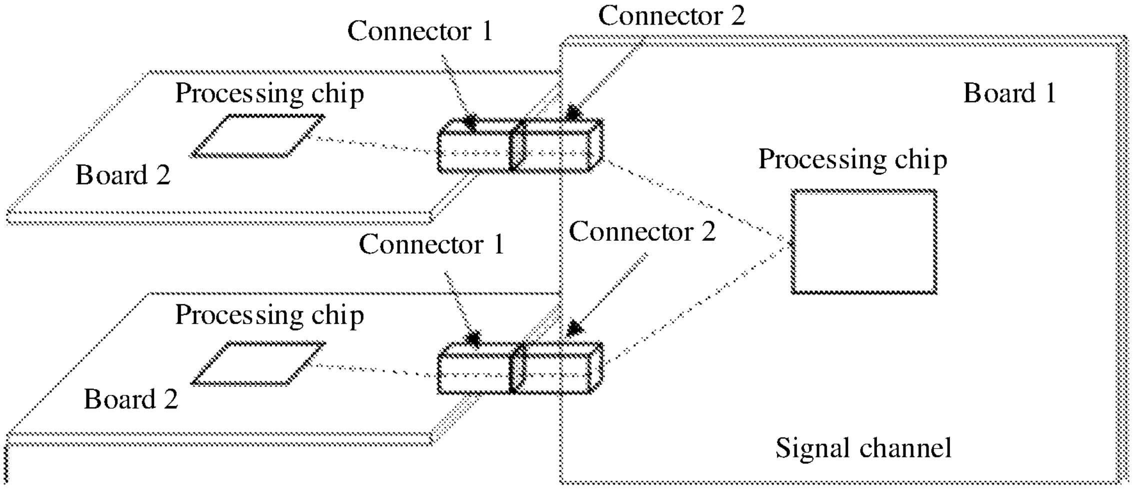
FIG. 1 is a schematic diagram of a simple communications system.
Figure 2:
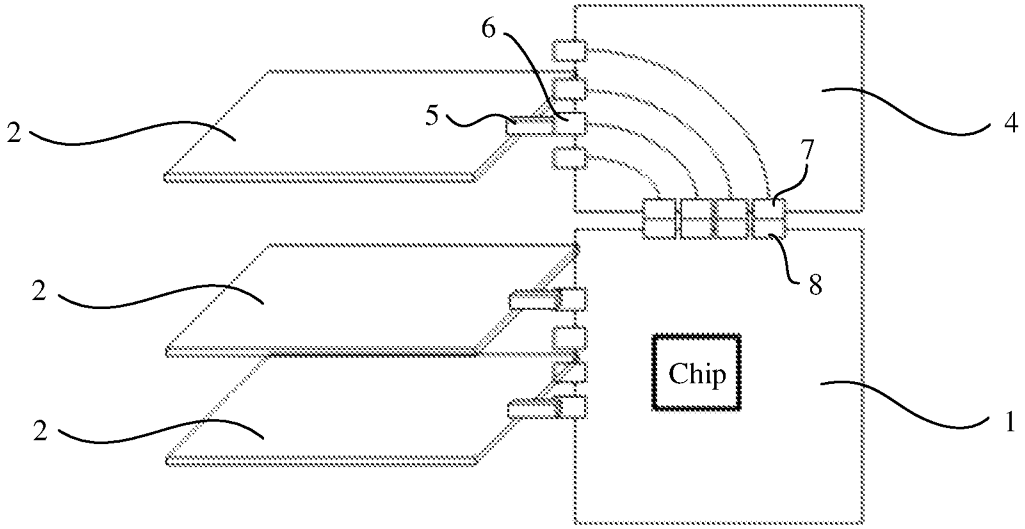
FIG. 2 is a schematic diagram of a connection manner between boards of a communications system in the conventional technology.

To facilitate understanding of a board-level architecture provided in the embodiments of this disclosure, an application scenario of the board-level architecture is first described. The board-level architecture is applied to a communications system, and different boards implement connections and communication of signals through connectors, for example, a connection manner between boards of the communications system in the conventional technology shown in FIG. 2. A board 1 is a fabric card, and a board 2 is a circuit board. As a quantity of boards 2 increases, larger connection space is required. Therefore, a support board 4 is added above or below the board 1, and the support board 4 is configured to support a connector component. As shown in FIG. 2, a connector component is fastened to the support board 4. A connector 6 and a connector 7 of the connector component respectively fit a connector 5 on the board 2 and a connector 8 on the board 1, to implement signal exchange. It can be learned from FIG. 2 that the connector 6 and the connector 7 are subject to features of the connector 5 and the connector 8 and are redeveloped, resulting in quite low applicability. In addition, two sides of the connector component need to additionally fit and be combined with the connectors, resulting in high-speed performance loss and high costs. Therefore, embodiments of this disclosure provide a board-level architecture, to simplify a connection of the board-level architecture and improve applicability of the board-level architecture. The following describes the board-level architecture in detail with reference to specific accompanying drawings and embodiments.

Figure 3:
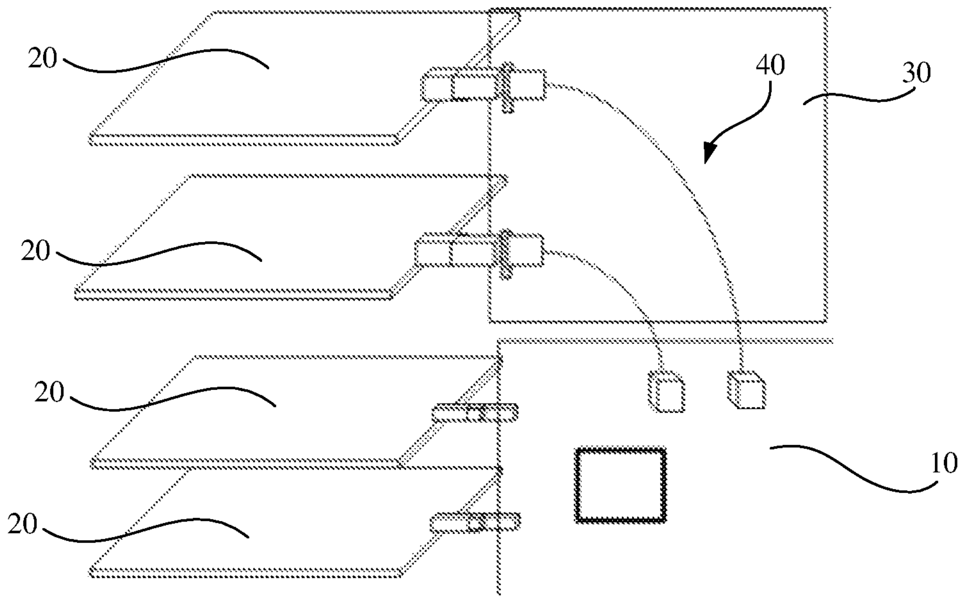
FIG. 3 is a schematic diagram of a specific application of a board-level architecture according to an embodiment of this disclosure.

FIG. 3 is a schematic diagram of a specific application of a board-level architecture according to an embodiment of this disclosure. The board-level architecture may include a support board 30, a switch board 10, and a press fit component 40. The press fit component 40 is configured to extend a connection port of the switch board 10, and as an extension part of the switch board 10, the support board 30 is configured to carry the press fit component 40. When the board-level architecture is configured to connect to service boards 20, some of the service boards 20 are directly connected to the switch board 10 through connectors, and the other service boards 20 are connected to the press fit component 40 and are connected to the switch board 10 through the press fit component 40.

Figure 4:
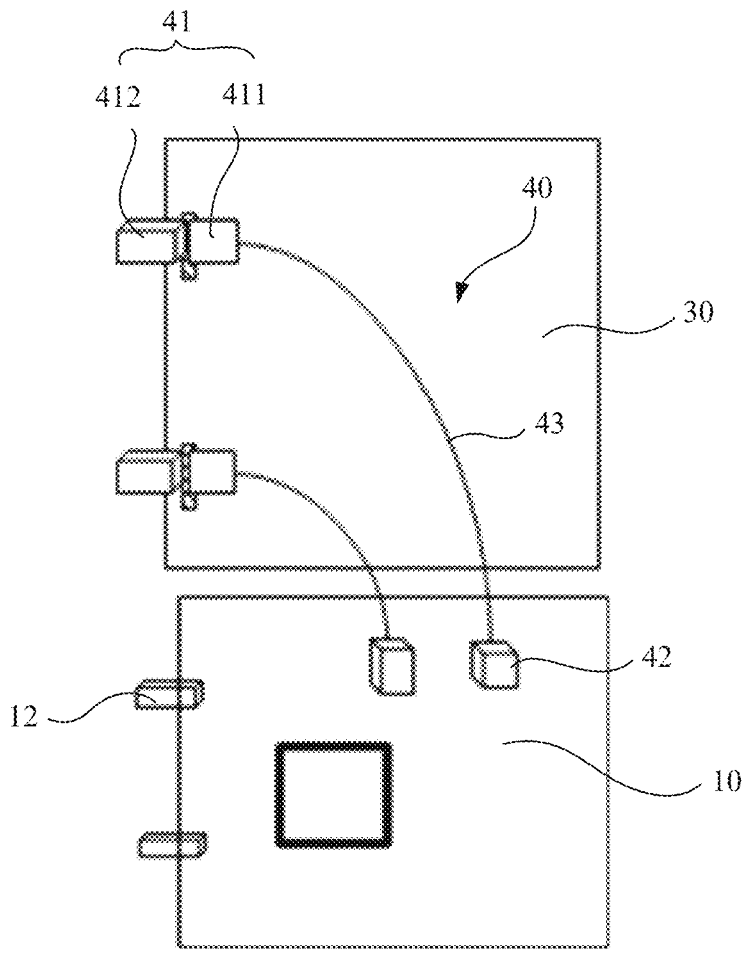
FIG. 4 is a schematic diagram of a specific structure of a board-level architecture according to an embodiment of this disclosure.

FIG. 4 is a schematic diagram of a specific structure of a board-level architecture according to an embodiment of this disclosure. For some reference numerals in FIG. 4, refer to the same reference numerals in FIG. 3. The press fit component 40 is mainly involved in the board-level architecture provided in this embodiment, and the press fit component 40 is configured to extend the connection port of the switch board 10. The press fit component 40 includes a first connector component 41, a second connector 42, and a cable 43 connecting the first connector component 41 and the second connector 42. The first connector component 41 is press-fitted on a side edge of the support board 30, and is configured to connect to the service board 20. The second connector 42 is press-fitted on a side edge of the switch board 10, and is configured to electrically connect to the switch board 10.

The first connector component 41 is a combined connector. The first connector component 41 includes a pluggable connector 412 and a first press fit cable connector 411, and the pluggable connector 412 is electrically connected to the first press fit cable connector 411. The first press fit cable connector 411 is located within coverage of the support board 30. The pluggable connector 412 is farther from the support board 30 than the first press fit cable connector 411, and may be partially or all located outside the support board 30. One end of the pluggable connector 412 is configured to connect to a connector of the service board 20, and the other end of the pluggable connector 412 is configured to detachably connect to the first press fit cable connector 411. The first press fit cable connector 411 is connected to the cable 43. When the foregoing structure is used, the first press fit cable connector 411 does not directly match the connector of the service board 20. Therefore, when a different type of connector is used for the service board 20, only the pluggable connector 412 needs to be replaced or a pluggable connector 412 that matches the connector is used, without a need to replace the first press fit cable connector 411 connected to the cable 43, so that the first press fit cable connector 411 is decoupled from the connector of the service board 20, thereby improving applicability of the press fit component 40.

In an optional solution, the second connector 42 may also be a press fit cable connector. For ease of description, the press fit cable connector is named a second press fit cable connector. When the press fit component 40 is electrically connected to the switch board 10, the second press fit cable connector may be directly fastened to the switch board 10 through press-fitting, and is electrically connected to a circuit layer of the switch board 10. It can be learned through comparison of FIG. 3 and FIG. 5 that, in comparison with a manner in which the press fit component 40 is detachably connected to the switch board 10 through two connectors in the conventional technology, according to the press fit component 40 provided in this embodiment, no additional connector needs to fit and be combined with the second press fit cable connector, so that the second press fit cable connector is decoupled, and connection points are also reduced, thereby improving high-speed performance of information transmission of the cable 43 and reducing costs of the board-level architecture.

Figure 5:
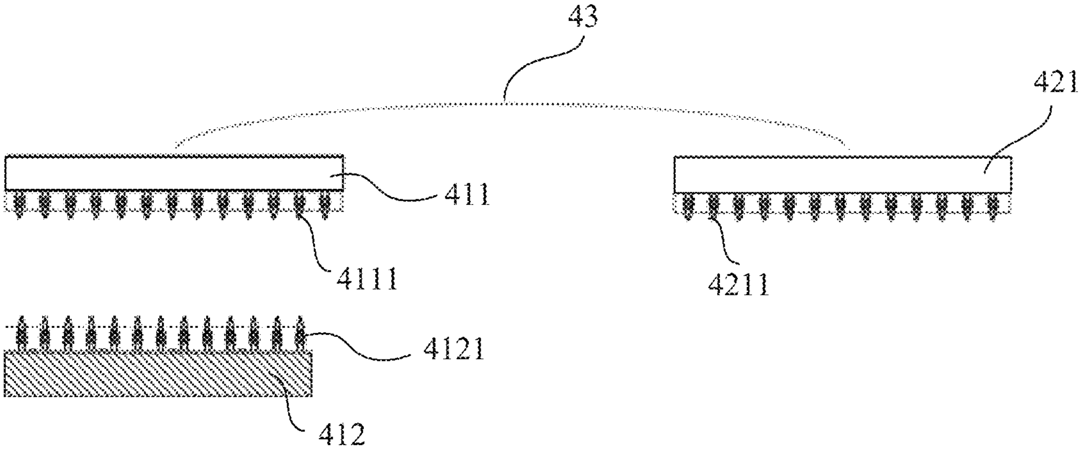
FIG. 5 is a schematic diagram of a structure of a press fit cable connector of a press fit component according to an embodiment of this disclosure.

FIG. 5 shows a structure of a press fit cable connector of a press fit component. For some reference numerals in FIG. 5, refer to the same reference numerals in FIG. 4. The first press fit cable connector 411 and a second press fit cable connector 421 provided in this embodiment are separately connected to two ends of the cable 43 based on a one-to-one correspondence. The pluggable connector 412 may be detachably connected to the first press fit cable connector 411.

The first press fit cable connector 411 has a plurality of first pins 4111. The pluggable connector 412 has a plurality of second pins 4121. The second pins 4121 and the first pins 4111 may be electrically connected through an adapter component. The second press fit cable connector 421 has a plurality of third pins 4211. When press-fitting is performed on a circuit board, the second press fit cable connector 421 may be electrically connected to the circuit board.

In an optional solution, the first pins 4111, the second pins 4121, and the third pins 4211 are disposed in a form of an array. The foregoing pins may be arranged in another manner.

In an optional solution, in addition to the one-to-one manner shown in FIG. 5, the first press fit cable connector 411 and the second press fit cable connector 421 may use a different manner such as a one-to-many manner or a many-to-one manner. For example, there is a plurality of first press fit cable connectors 411, there is one second press fit cable connector 421, and the plurality of first press fit cable connectors 411 is connected to the second press fit cable connector 421 through the cable, or there is one first press fit cable connector 411, there is a plurality of second press fit cable connectors 421, and the first press fit cable connector 411 is connected to the plurality of second press fit cable connectors 421 through the cable. Flexible setting manners may be implemented by using different correspondences, to increase flexibility of the board-level architecture during construction.

Figure 6:
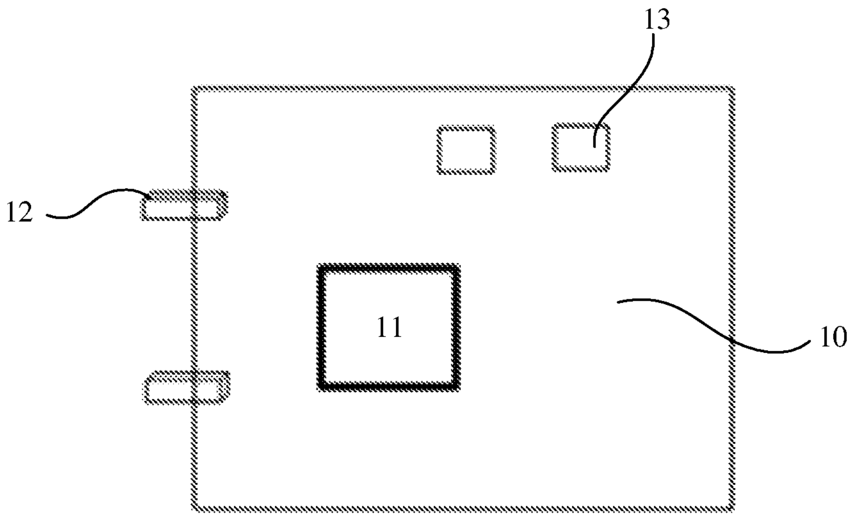
FIG. 6 is a schematic diagram of a specific structure of a switch board according to an embodiment.

FIG. 6 shows a specific structure of a switch board. Only a connection manner between the switch board 10 and another board is specifically involved in this disclosure. A chip 11 and a component that are specifically disposed on the switch board 10 are not specifically limited. In the conventional technology, a component and a component arrangement manner of a consistent functional board in the communications system may be applied to this embodiment. For example, the chip 11 is disposed on the switch board 10, and the chip 11 is connected to the circuit layer of the switch board 10. Third connectors 12 are disposed on an edge of the switch board 10. Models of a plurality of third connectors 12 match a model of the connector of the service board, and the connector of the service board may be directly detachably connected to the third connectors 12.

In an optional solution, when the second connector of the press fit component is a press fit cable connector, a press-fitting area 13 corresponding to the second press fit cable connector is disposed on the switch board 10. Metalized vias (not shown in FIG. 6) that fit the third pins of the second press fit cable connector are disposed in the press-fitting area 13. When the third pins are inserted into the metalized vias, the second press fit cable connector may be connected to the circuit layer of the switch board 10 through the fit between the third pins and the metalized vias.

Figure 7:
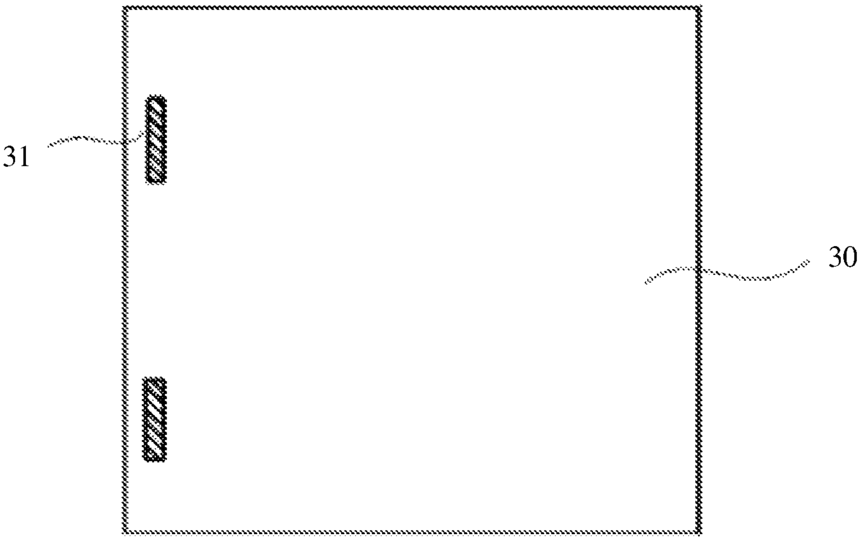
FIG. 7 is a schematic diagram of a specific structure of a support board according to an embodiment.

FIG. 7 is a schematic diagram of a specific structure of a support board. The support board 30 is configured to carry the press fit component, the support board 30 has a first surface used to carry the press fit component, and the press fit component may be fastened to the first surface. When carrying the press fit component, the pluggable connector is press-fitted on the support board 30, and the first press fit cable connector is also press-fitted on the support board 30. After being press-fitted on the structural part, the first press fit cable connector is electrically connected to the pluggable connector.

In this disclosure, a specific structural form of the support board 30 is not limited, for example, the support board 30 has different shapes such as a rectangle, a square, or an oval.

In an optional solution, the switch board may be disposed in parallel with the support board to facilitate fastening of the press fit component. In a specific example shown in FIG. 4, the switch board 10 and the support board 30 are located on a same plane. Certainly, there is alternatively a height difference of a specific value between the switch board 10 and the support board 30, to adapt to installation space of the board-level architecture in a communications device.

Figure 8:
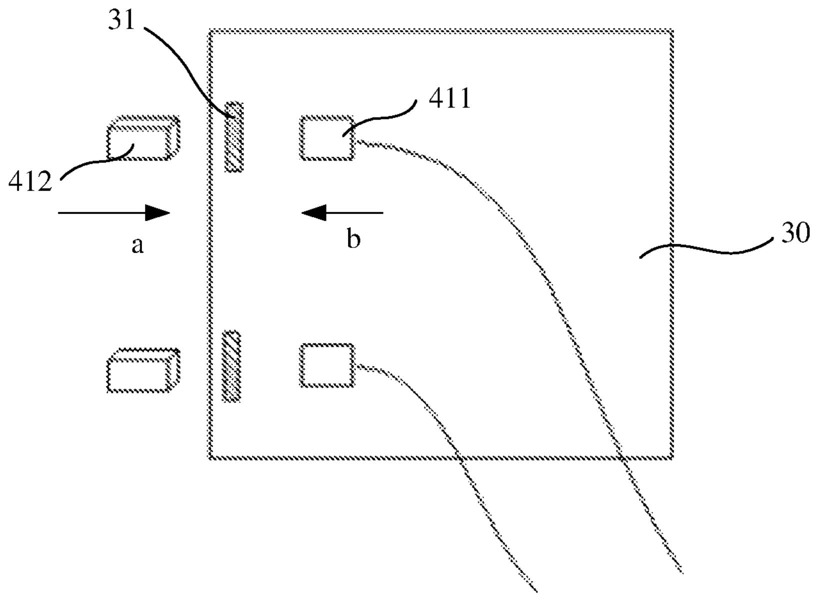
FIG. 8 is a schematic diagram of assembling a press fit component to an adapter component.

In addition, the support board 30 may be further configured to decouple a connector of the press fit component from the connector of the service board. An adapter component 31 that fits the press fit component is disposed on the support board 30. FIG. 8 is a schematic diagram of assembling a press fit component to an adapter component. The pluggable connector 412 may be press-fitted on the adapter component 31 in a direction a, and the first press fit cable connector 411 may be press-fitted on the adapter component 31 in a direction b, and the first press fit cable connector 411 may be electrically connected to the pluggable connector 412 through the adapter component 31. The direction a and the direction b are opposite.

In an optional implementation solution, when the press fit component uses the structure shown in FIG. 5, a plurality of metalized vias is disposed on the adapter component 31. The plurality of first pins of the first press fit cable connector 411 may be inserted into corresponding metalized vias based on a one-to-one correspondence. The plurality of second pins of the pluggable connector 412 may be inserted into corresponding metalized vias based on a one-to-one correspondence. The pluggable connector 412 is electrically connected to the first press fit cable connector 411 through the metalized vias.

In an optional implementation solution, the adapter component 31 may be a PCB or another circuit board that can implement a conductive connection between two components.

In an optional solution, the adapter component 31 is fastened to a first surface of the support board 30. For example, the adapter component 31 may be fastened to the first surface of the support board 30 through bonding, welding, or a threaded connecting piece (a bolt or a screw).

In an optional solution, the adapter component 31 may be a part of the support board 30. For example, a manner similar to disposing a press-fitting area on the switch board may be used to directly obtain a metalized via on the support board 30. The pluggable connector 412 and the first press fit cable connector 411 are separately press-fitted on the metalized via of the support board 30 from two opposite surfaces of the support board 30, to implement an electrical connection between the pluggable connector 412 and the first press fit cable connector 411.

Figure 9:
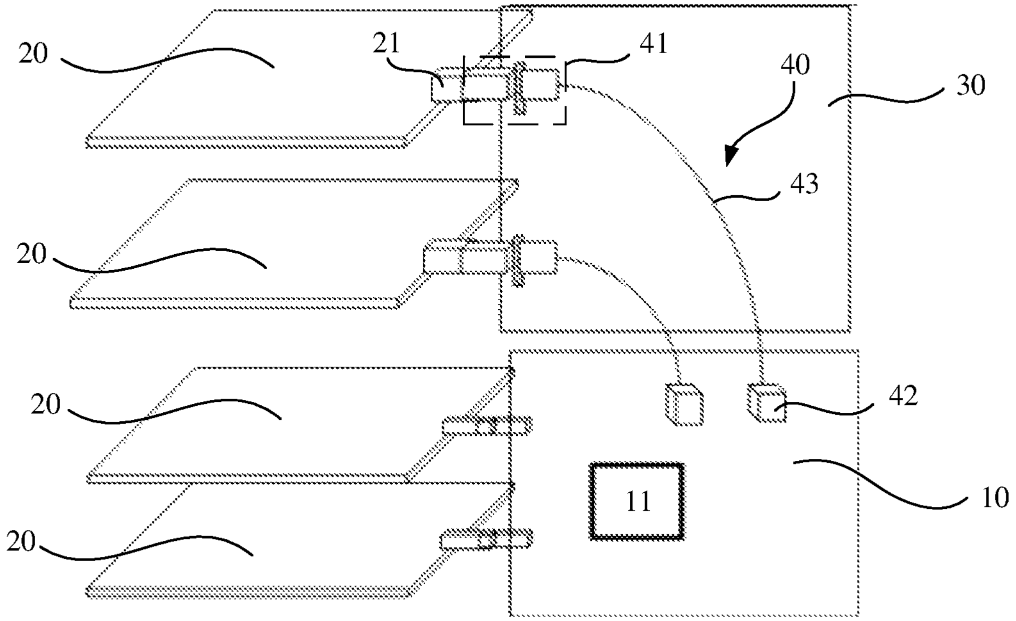
FIG. 9 is a schematic diagram of another board-level architecture according to an embodiment of this disclosure.

FIG. 9 shows another board-level architecture according to an embodiment of this disclosure. For some reference numerals in FIG. 9, refer to the same reference numerals in FIG. 3. A difference from the board-level architecture shown in FIG. 3, the service boards 20 in FIG. 3 are connecting components of the board-level architecture, and in the board-level architecture shown in FIG. 9, service boards 20 are a part of the board-level architecture. In the service boards 20 in FIG. 9, some of the service boards 20 are directly connected to connectors of a switch board 10 through connectors 21, and connectors 21 of the other service boards 20 are connected to first connector components 41 of a press fit component 40, and are connected to the switch board 10 through the press fit component 40. When being connected through the press fit component 40, the connector 21 connected to the service board 20 may be detachably connected to the first connector component 41. When the foregoing structure is used, only a pluggable connector is connected to the connector of the service board 20. Therefore, it is only required that the pluggable connector and the connector of the service board 20 match, and a first press fit cable connector and a second press fit cable connector may be decoupled from the connector of the service board 20. Therefore, the first press fit cable connector and the second press fit cable connector each may be another type of connector, so that flexibility of the board-level architecture during construction is increased. In addition, the second press fit cable connector may be directly electrically connected to the switch board 10 without a need of disposing a connector corresponding to the second press fit cable connector, so that a structure of the board-level architecture is simplified.

Figure 10:
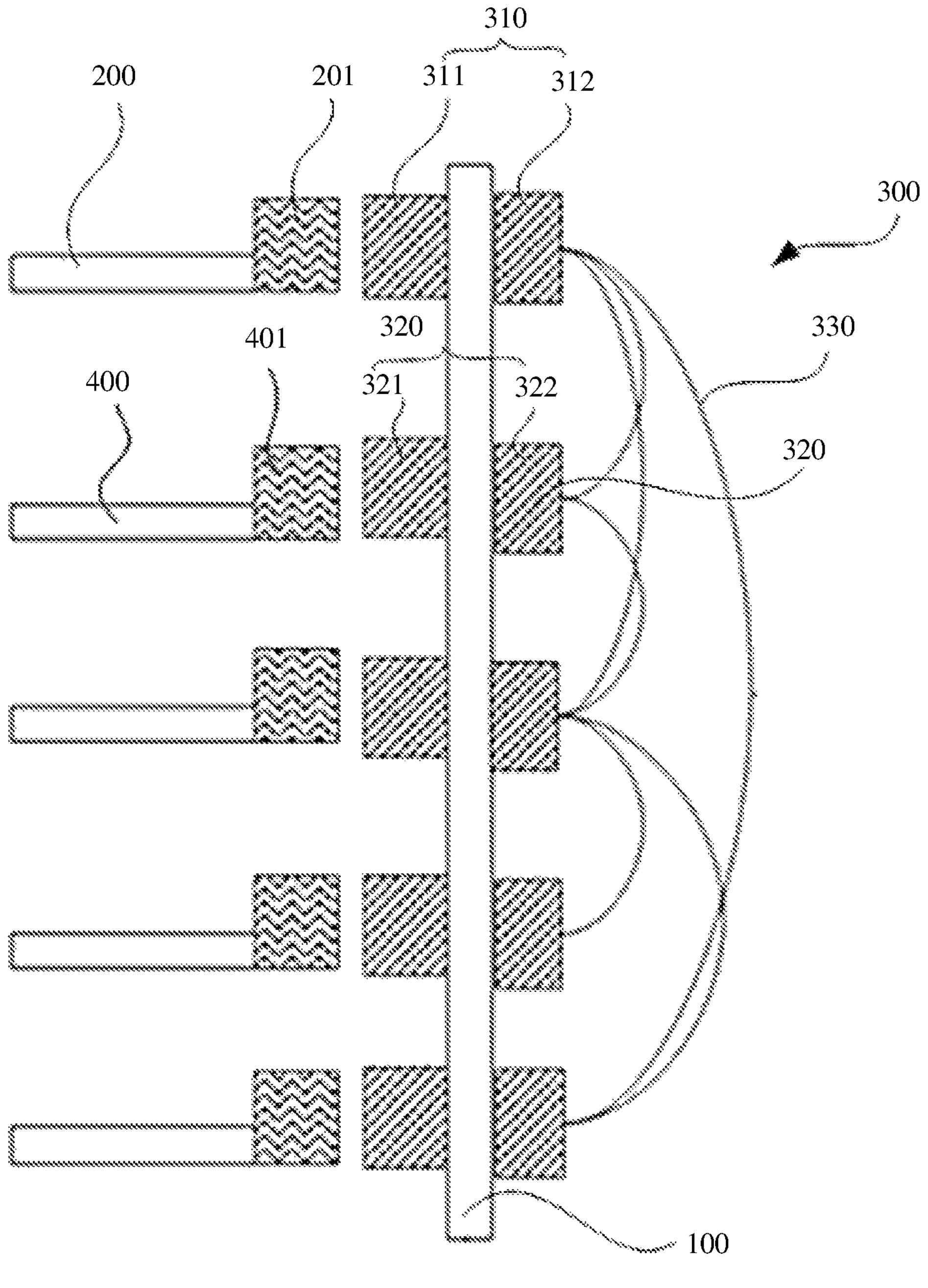
FIG. 10 is a schematic diagram of another board-level architecture according to an embodiment of this disclosure.

FIG. 10 is a schematic diagram of an application of another board-level architecture according to an embodiment of this disclosure. The board-level architecture provided in this embodiment may be applied to a backplane scenario of a communications system. The board-level architecture may include a backplane 100 and a press fit component 300. When the board-level architecture is configured to connect a service board 200 and a switch board 400, the service board 200 and the switch board 400 may be connected through the press fit component 300 by using a signal, and the service board 200 and the switch board 400 are supported by the backplane 100.

Still referring to FIG. 10, the press fit component 300 is mainly involved in the board-level architecture provided in this embodiment. The press fit component 300 includes a first connector component 310, a second connector component 320, and a cable 330 connecting the first connector component 310 and the second connector component 320. The first connector component 310 and the second connector component 320 are respectively configured to connect to the service board 200 and the switch board 400.

In this embodiment, both the first connector component 310 and the second connector component 320 are combined connectors, the first connector component 310 includes a first pluggable connector 311 and a first press fit cable connector 312, and the first pluggable connector 311 may be electrically connected to the first press fit cable connector 312. One end of the first pluggable connector 311 is configured to connect to a connector 201 of the service board 200, and the other end is configured to connect to the first press fit cable connector 312. The first press fit cable connector 312 is connected to the cable 330.

The second connector component 320 includes a second pluggable connector 321 and a second press fit cable connector 322, and the second pluggable connector 321 may be electrically connected to the second press fit cable connector 322. One end of the second pluggable connector 321 is configured to connect to a connector 401 of the switch board 400, and the other end is configured to connect to the second press fit cable connector 322. The second press fit cable connector 322 is connected to the cable 330.

For specific structures of the first press fit cable connector 312 and the second press fit cable connector 322, refer to the detailed descriptions in FIG. 5. Details are not described herein again.

When the press fit component 300 is assembled to the backplane 100, the first pluggable connector 311 and the second pluggable connector 321 are separately press-fitted on a first surface of the backplane 100; the first press fit cable connector 312 is press-fitted on a second surface of the backplane 100, and the first press fit cable connector 312 is electrically connected to the first pluggable connector 311; and the second press fit cable connector 322 is press-fitted on the second surface of the backplane 100, and the second press fit cable connector 322 is electrically connected to the second pluggable connector 321. When an electrical connection is specifically implemented, taking the first connector component 310 as an example, a plurality of metalized vias (not shown in FIG. 11) is disposed on the backplane 100, and the first press fit cable connector 312 and the second press fit cable connector 322 each have first pins that fit the plurality of metalized vias. The first pluggable connector 311 and the second pluggable connector 321 each have second pins that fit the plurality of metalized vias. The first pluggable connector 311 is connected to the corresponding first press fit cable connector 312 through fitness between the metalized vias and the first pins and the second pins.

In an optional example, a press-fitting area that fits the first connector component 310 and the second connector component 320 is disposed on the backplane 100, and the foregoing metalized vias are disposed in the press-fitting area. The first pluggable connector 311 and the first press fit cable connector 312 are press-fitted on the press-fitting area from two opposite sides of the backplane 100, to implement an electrical connection. An assembly manner of the second connector component 320 is the same as that of the first connector component 310, and details are not described herein again.

In FIG. 10, the backplane 100 serves as both a circuit board and a support board for carrying the press fit component 300. When the service board 200 and the switch board 400 are assembled, the connector 201 of the service board 200 and the connector 401 of the switch board 400 may be directly connected to the first pluggable connector 311 or the second pluggable connector 321. Therefore, a high-speed signal of the press fit component 300 may be transmitted on the backplane 100, and a low-speed signal and a power supply signal may be transmitted through another connector of the backplane 100.

When the first connector component 310 and the second connector component 320 use combined connectors, the first press fit cable connector 312 connected to the cable 330 does not need to match the connector 201 of the service board 200, and the second press fit cable connector 322 does not need to match the connector 401 of the switch board 400. Therefore, when the connector 201 and the connector 401 are different types of connectors, only the pluggable connectors need to be replaced, or pluggable connectors that match the connector 201 and the connector 401 are used, without a need to replace the first press fit cable connector 312 and the second press fit cable connector 322 connected to the cable 330, the first press fit cable connector 312 and the second press fit cable connector 322 are decoupled from the connector 201 and the connector 401, thereby improving applicability of the press fit component 300.

In an optional solution, the first press fit cable connector 312 and the second press fit cable connector 322 may use different correspondence manners such as a one-to-one manner, a one-to-many manner, and a many-to-one manner. For example, there is a plurality of first press fit cable connectors 312, there is one second press fit cable connector 322, and the plurality of first press fit cable connectors 312 is connected to the second press fit cable connector 322 through the cable 330, or there is one first press fit cable connector 312, there is a plurality of second press fit cable connectors 322, and the first press fit cable connector 312 is connected to the plurality of second press fit cable connectors 322 through the cable 330. Flexible setting manners may be implemented by using different correspondences, to increase flexibility of the board-level architecture during construction.

In an optional solution, the service board 200 and the switch board 400 may be alternatively used as a part of the board-level architecture. The connector 201 of the service board 200 may be detachably connected to the first pluggable connector 311, and the connector 401 of the switch board 400 may be detachably connected to the second pluggable connector 321.

It can be learned from the foregoing descriptions that, in the board-level architecture used in this embodiment, only the pluggable connector is electrically connected to a connector of another board. Therefore, it is only required that the pluggable connector and the connector of the another board match, and the first press fit cable connector 312 and the second press fit cable connector 322 may be decoupled from the connector of the another board. Therefore, the first press fit cable connector 312 and the second press fit cable connector 322 each may be another type of connector, so that flexibility of the board-level architecture during construction is increased. In addition, when the foregoing structure is used, the service board 200 and the switch board 400 may be disposed on a same side of the backplane 100, to facilitate a detachable connection between the service board 200 and the switch board 400.

Figure 11:
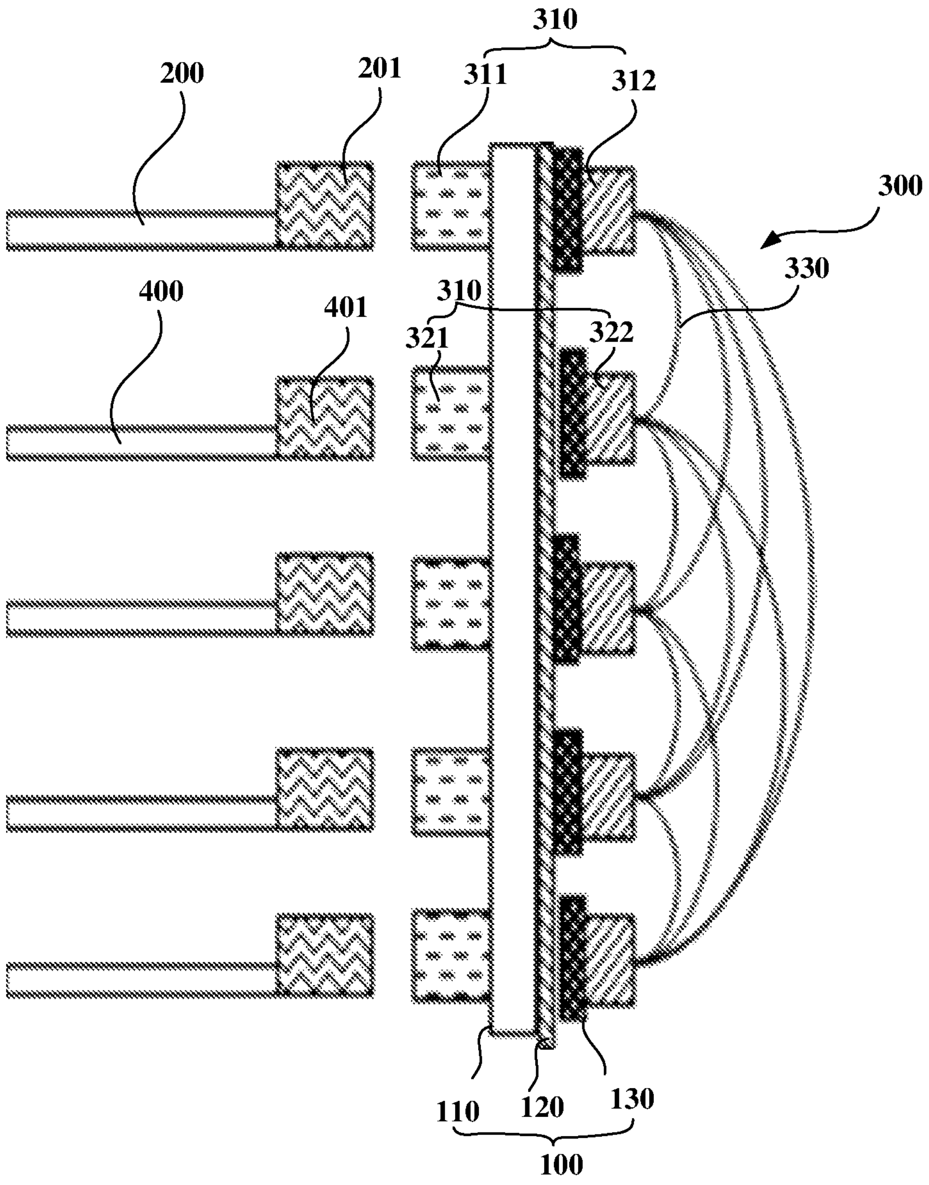
FIG. 11 is a schematic diagram of a deformed structure of the board-level architecture shown in FIG. 10.

FIG. 11 shows a deformed structure of the board-level architecture shown in FIG. 10. Different from FIG. 10, a backplane 100 in FIG. 11 uses a multi-layer structure. The backplane 100 includes a power supply backplane 110 and a high-speed backplane 120 that are stacked upon each other. When in use, the high-speed backplane 120 is configured to implement transmission of a high-speed signal, which is specifically transmitting a high-speed signal of the press fit component 300, and the power supply backplane 110 is configured to implement transmission of a low-speed signal and a power supply signal, which is specifically transmitting a low-speed signal and a power supply signal through another connector.

Figure 12:
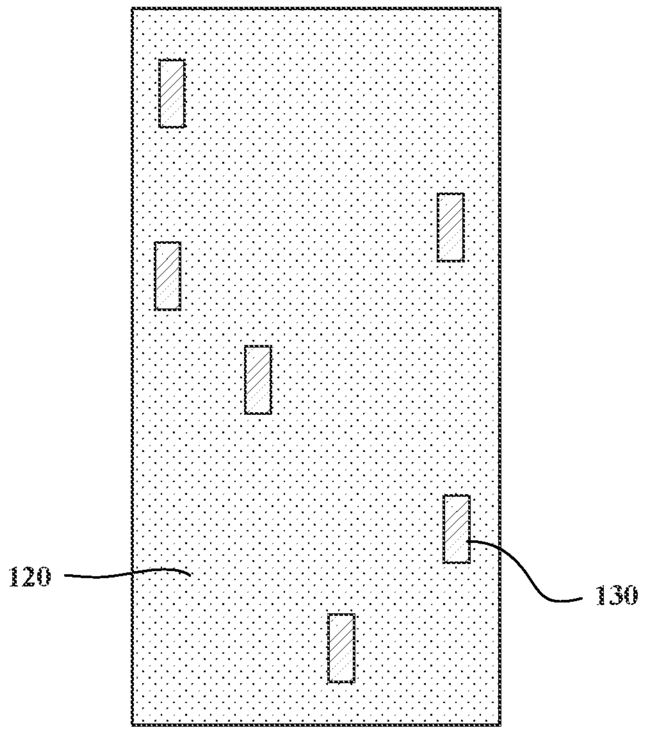
FIG. 12 is a schematic diagram of a structure of a high-speed backplane according to an embodiment of this disclosure.

FIG. 12 is a schematic diagram of a structure of a high-speed backplane. With reference to FIG. 11 and FIG. 12, the high-speed backplane 120 has a first surface and a second surface that are opposite to each other, and the first press fit cable connector 312 and the second press fit cable connector 322 may be separately press-fitted on the second surface of the high-speed backplane 120. The first pluggable connector 311 and the second pluggable connector 321 are separately press-fitted on the first surface of the high-speed backplane 120.

In an optional solution, an adapter component 130 is disposed on the high-speed backplane 120, and the first press fit cable connector 312 and the first pluggable connector 311 are respectively press-fitted on two opposite surfaces of the adapter component 130. The second press fit cable connector 322 and the second pluggable connector 321 are separately press-fitted on the two opposite surfaces of the adapter component 130. During a specific connection, a plurality of metalized vias is disposed on the adapter component 130, and the first pluggable connector 311 and the second pluggable connector 321 may be respectively electrically connected to the first press fit cable connector 312 and the second press fit cable connector 322 through metalized vias on corresponding adapter components 130.

In an optional implementation solution, the adapter component 130 may be a PCB or another circuit board on which a metalized via can be disposed. The adapter component 130 may be fastened to the high-speed backplane 120 through bonding, welding, or the like, or the adapter component 130 is a part of a structure of the high-speed backplane 120.

Figure 13:
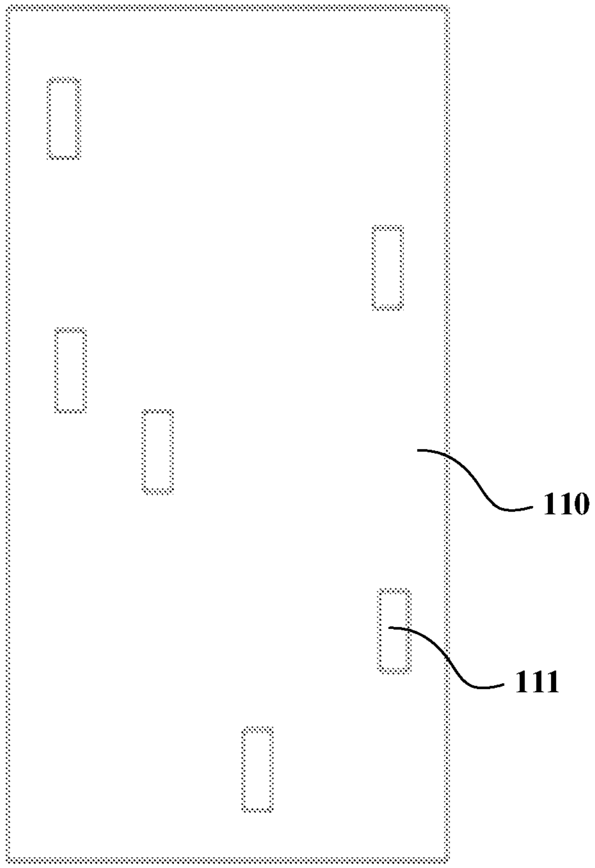
FIG. 13 is a schematic diagram of a structure of a power supply backplane according to an embodiment of this disclosure.

FIG. 13 is a schematic diagram of a structure of a power supply backplane. Through-holes 111 for avoiding the first pluggable connector 311 and the second pluggable connector 321 are disposed on the power supply backplane 110. When the power supply backplane 110 and the high-speed backplane 120 are stacked upon each other, the power supply backplane 110 and the high-speed backplane 120 may be connected in different connection manners, for example, through bonding, welding, or clamping, or may be connected through a threaded connecting piece (a bolt or a screw). The power supply backplane 110 and the high-speed backplane 120 are parallel, and the through-holes 111 on the power supply backplane 110 are in a one-to-one correspondence with adapter components 130 on the high-speed backplane 120, so that the adapter component 130 can be exposed in the through-hole 111. When the first pluggable connector 311 and the second pluggable connector 321 are assembled, the first pluggable connector 311 and the second pluggable connector 321 may be connected to the adapter component 130 after passing through the through-holes 111 on the power supply backplane 110.

In an optional solution, the first press fit cable connector 312 and the second press fit cable connector 322 may use different correspondence manners such as a one-to-one manner, a one-to-many manner, and a many-to-one manner. For example, there is a plurality of first press fit cable connectors 312, there is one second press fit cable connector 322, and the plurality of first press fit cable connectors 312 is connected to the second press fit cable connector 322 through the cable 330, or there is one first press fit cable connector 312, there is a plurality of second press fit cable connectors 322, and the first press fit cable connector 312 is connected to the plurality of second press fit cable connectors 322 through the cable 330. Flexible setting manners may be implemented by using different correspondences, to increase flexibility of the board-level architecture during construction.

In an optional solution, the service board 200 and the switch board 400 may be alternatively used as a part of the board-level architecture. The connector 201 of the service board 200 may be detachably connected to the first pluggable connector 311, and the connector 401 of the switch board 400 may be detachably connected to the second pluggable connector 321.

It can be learned from the foregoing descriptions that, in the board-level architecture used in this embodiment, only the pluggable connector is electrically connected to a connector of another board. Therefore, it is only required that the pluggable connector and the connector of the another board match, and the first press fit cable connector 312 and the second press fit cable connector 322 may be decoupled from the connector of the another board. Therefore, the first press fit cable connector 312 and the second press fit cable connector 322 each may be another type of connector, so that flexibility of the board-level architecture during construction is increased. In addition, when the foregoing structure is used, the service board 200 and the switch board 400 may be disposed on a same side of the backplane 100, to facilitate a detachable connection between the service board 200 and the switch board 400.

An embodiment of this disclosure further provides a communications device. The communications device includes a housing and the board-level architecture according to any one of the foregoing optional solutions that is disposed in the housing. A pluggable connector is configured to electrically connect to a connector of another board. Therefore, it is only required that the pluggable connector and the connector of the another board match, and a first press fit cable connector and a second press fit cable connector may be decoupled from the connector of the another board. Therefore, the first press fit cable connector and the second press fit cable connector each may be another type of connector, so that flexibility of the board-level architecture during construction is increased. In addition, the second press fit cable connector may be directly electrically connected to a service board without a need of disposing a connector corresponding to the second press fit cable connector, so that a structure of the board-level architecture is simplified.

It is clear that, a person skilled in the art can make various modifications and variations to this disclosure without departing from the spirit and scope of this disclosure. This disclosure is intended to cover these modifications and variations of this disclosure provided that the modifications and variations fall within the scope of protection defined by the following claims and their equivalent technologies.

What is claimed is:

1. A board-level apparatus comprising a support board, a switch board, and a press fit component, wherein the press fit component comprises a cable, a first connector component that is press-fitted on a side edge of the support board, and a second press fit cable connector that is press-fitted on a side edge of the switch board;

the first connector component comprises a first press fit cable connector and a pluggable connector that is electrically connected to the first press fit cable connector, and the pluggable connector is farther from the support board than the first press fit cable connector; and the first press fit cable connector is connected to the second press fit cable connector through the cable.

2. The board-level apparatus according to claim 1, wherein an adapter component is disposed on the support board, and the first press fit cable connector and the pluggable connector are respectively press-fitted on two opposite surfaces of the adapter component.

3. The board-level apparatus according to claim 2, wherein a plurality of metalized is disposed on the adapter component;

the first press fit cable connector has first pins that fit the plurality of metalized vias; and the pluggable connector has second pins that fit the plurality of metalized vias.

4. The board-level apparatus according to claim 1, further comprising a service board, wherein the service board has a connector, wherein the connector of the service board is detachably connected to the pluggable connector.

5. The board-level apparatus according to claim 1, wherein the press fit component comprises a plurality of first press fit cable connectors, and one second press fit cable connector, and the plurality of first press fit cable connectors is connected to the one second press fit cable connector through the cable; or the press fit component comprises one first press fit cable connector, and a plurality of second press fit cable connectors, and the one first press fit cable connector is connected to the plurality of second press fit cable connectors through the cable.

6. A board-level apparatus, comprising a backplane and a press fit component, wherein the backplane comprises a first surface and a second surface that are opposite to each other; and the press fit component comprises a first connector component, a second connector component, and a cable, wherein the first connector component comprises a first pluggable connector that is press-fitted on the first surface and a first press fit cable connector that is press-fitted on the second surface, and the first press fit cable connector is electrically connected to the first pluggable connector;

the second connector component comprises a second pluggable connector that is press-fitted on the first surface and a second press fit cable connector that is press-fitted on the second surface, and the second press fit cable connector is electrically connected to the second pluggable connector; and the first press fit cable connector is connected to the second press fit cable connector through the cable.

7. The board-level apparatus according to claim 6, wherein the backplane comprises a high-speed backplane and a power supply backplane that are stacked upon each other, the first press fit cable connector and the second press fit cable connector are separately press-fitted on a second surface of the high-speed backplane;

the first pluggable connector and the second pluggable connector are separately press-fitted on a first surface of the high-speed backplane; and through-holes for avoiding the first pluggable connector and the second pluggable connector are disposed on the power supply backplane.

8. The board-level apparatus according to claim 7, wherein the power supply backplane is configured to implement transmission of a low-speed signal and a power supply signal, and the high-speed backplane is configured to implement transmission of a high-speed signal.

9. The board-level apparatus according to claim 7, wherein an adapter component is disposed on the high-speed backplane;

the first press fit cable connector and the first pluggable connector are respectively press-fitted on two opposite surfaces of the adapter component; and the second press fit cable connector and the second pluggable connector are separately press-fitted on the two opposite surfaces of the adapter component.

10. The board-level apparatus according to claim 6, wherein a plurality of metalized vias is disposed on the backplane;

the first press fit cable connector and the second press fit cable connector each have first pins that fit the plurality of metalized vias; and the first pluggable connector and the second pluggable connector each have second pins that fit the plurality of metalized vias.

11. The board-level apparatus according to claim 6, further comprising a service board and a switch board, wherein the service board and the switch board each have a connector, wherein the connector of the service board is configured to detachably connect to the first pluggable connector; and the connector of the switch board is configured to detachably connect to the second pluggable connector.

12. The board-level apparatus according to claim 6, wherein the press fit component comprises a plurality of first press fit cable connectors, and one second press fit cable connector, and the plurality of first press fit cable connectors is connected to the one second press fit cable connector through the cable; or the press fit component comprises one first press fit cable connector, and a plurality of second press fit cable connectors, and the one first press fit cable connector is connected to the plurality of second press fit cable connectors through the cable.

13. A communications device, comprising a housing and a board-level apparatus that is disposed in the housing, wherein the board-level apparatus comprises a support board, a switch board, and a press fit component;

the press fit component comprises a cable, a first connector component that is press-fitted on a side edge of the support board, and a second press fit cable connector that is press-fitted on a side edge of the switch board;

the first connector component comprises a first press fit cable connector and a pluggable connector that is electrically connected to the first press fit cable connector, and the pluggable connector is farther from the support board than the first press fit cable connector; and the first press fit cable connector is connected to the second press fit cable connector through the cable.

* * * * *